United States Patent [19]

Conner, Jr. et al.

[11] Patent Number: 4,691,692

[45] Date of Patent: Sep. 8, 1987

[54] SOLAR ENERGY SYSTEM WITH DELAYED DRAIN-BACK

[76] Inventors: Leo B. Conner, Jr., 2444 N. 39th Pl., Phoenix, Ariz. 85018; John M. Conner, 1458 N. Ashland, Mesa, Ariz. 85203

[21] Appl. No.: 804,828

[22] Filed: Dec. 5, 1985

[51] Int. Cl.⁴ .............................................. F24J 2/40
[52] U.S. Cl. ................................. 126/422; 126/427; 126/435; 126/437
[58] Field of Search ............... 126/420, 421, 422, 427, 126/435, 437

[56] References Cited

U.S. PATENT DOCUMENTS

| | | | |
|---|---|---|---|
| 4,007,776 | 2/1977 | Alkasab | 126/427 |
| 4,027,821 | 6/1977 | Hayes et al. | 237/1 A |
| 4,037,785 | 7/1977 | Madern | 126/427 |
| 4,237,862 | 12/1980 | Embree | 126/420 |
| 4,262,658 | 4/1981 | Frissora | 126/420 |
| 4,336,792 | 6/1982 | Seiler | 126/420 |
| 4,458,669 | 7/1984 | Lee | 126/420 |
| 4,524,726 | 6/1985 | Bindl | 126/427 |

Primary Examiner—James C. Yeung
Assistant Examiner—Noah Kamen
Attorney, Agent, or Firm—Lowell W. Gresham

[57] ABSTRACT

A solar energy system in which a heat transferring liquid captures heat in solar collectors and stores it in a storage tank is disclosed. A pump moves heat transferring liquid from the storage tank to the collectors and into a drain-back module only when a predetermined activation temperature is achieved. The pump then inactivates allowing heat transferring liquid within the collectors to heat. When the pump initially inactivates, a siphon or draining cycle is formed which moves heat transferring liquid from the drain-back module to the storage tank. Gas within the storage tank replaces heat transferring liquid in the collectors through the drain-back module to achieve drain-back. However, the siphon or draining operation must first cause heat transferring liquid within the drain-back module to fall below a drain-back feed point. Thus, the solar energy system delays drain-back until after the siphon or draining operation is completed.

17 Claims, 5 Drawing Figures

SOLAR ENERGY SYSTEM WITH DELAYED DRAIN-BACK

BACKGROUND OF THE INVENTION

This invention relates generally to solar energy systems. Specifically, the present invention relates to solar energy systems in which a heat transferring liquid, such as water, circulates through a storage tank and a solar collector while the system is active, but drains back from the solar collector to the storage tank after the system becomes inactive.

The "drain-back" feature removes a risk of damage to the solar collector which may occur when the solar collector is exposed to freezing temperatures. Additionally, drain-back prevents convectional circulation of the liquid which may occur when the collector is located above the storage tank, and the collector exhibits a temperature lower than that of the storage tank.

Prior solar energy systems have incorporated drain-back features. However, conventional techniques for draining collectors tend to result in solar energy systems which are less reliable, less efficient, and less economical than desired. For example, some solar energy systems permit drain-back to occur the instant a heat transferring liquid stops moving through the collector. Each time the system initiates circulation of the liquid it must refill the collectors with liquid. Collectors are typically located above a storage tank. Thus, a pump consumes a great amount of time lifting the liquid from a storage tank to the collector in order to refill the collector. A higher energy cost and reduced pump life is associated with operating the pump for such longer periods of time.

Further, solar energy systems which permit drain-back the instant the heat transferring liquid stops moving through the collector demonstrate a reduced efficiency. Such systems typically resume circulation of the liquid when the collector heats to a temperature greater than the temperature of the storage tank. Since no liquid resides in the collector as the collector heats, no liquid heats along with the collector. Thus, such systems lose the opportunity to transfer heated liquid into the storage tank when they initiate circulation of the liquid.

In many prior solar energy systems the pump continuously runs so long as the collector temperature is greater than the temperature of the storage tank. Other systems continuously run the pump as long as a small temperature rise, such as 3 degrees, can be exhibited between liquid leaving the storage tank and liquid entering the storage tank. Either approach forces the pump to operate many hours every day and consume a greater amount of power. Resultingly, a high energy cost associates with operating such systems, and a pump motor experiences a shorter operating life.

SUMMARY OF THE INVENTION

Accordingly, it is an object of the present inventon to provide an improved solar energy system which permits drain-back only after a predetermined amount of time passes following the stopping of circulation of a heat transferring liquid.

Another object of the present invention concerns providing an improved solar energy system which minimizes the amount of time a pump expends to circulate heat transferring liquid.

Yet another object of the present invention concerns providing an improved solar energy system which demonstrates favorable reliability, efficiency and cost characteristics.

The above and other objects and advantages of the present invention are carried out in one form by a storage tank, a solar collector, a pump, and a drain-back module. The storage tank has a lower section which holds a heat transferring liquid and an upper section which holds a gas. The solar collector has a feed and a return. One of the collector feed and return couples to the lower section of the storage tank. The pump couples to the lwoer section of the storage tank and to the other of the collector feed and return. The drain-back module couples at a feed thereof to the collector and at a return thereof to the upper section of the storage tank. When the pump activates, it moves the liquid into the solar collector. When the pump inactivates, the drain-back module prevents the gas from replacing the liquid in the collector until a predetermined amount of time passes.

BRIEF DESCRIPTION OF THE DRAWINGS

A more complete understanding of the present invention may be derived by reference to the detailed description and claims when considered in connection with the accompanying drawings in which like reference numbers indicate similar parts, and wherein:

DETAILED DESCRIPTION OF THE PREFERRED EMBODIMENTS

Figure 1:
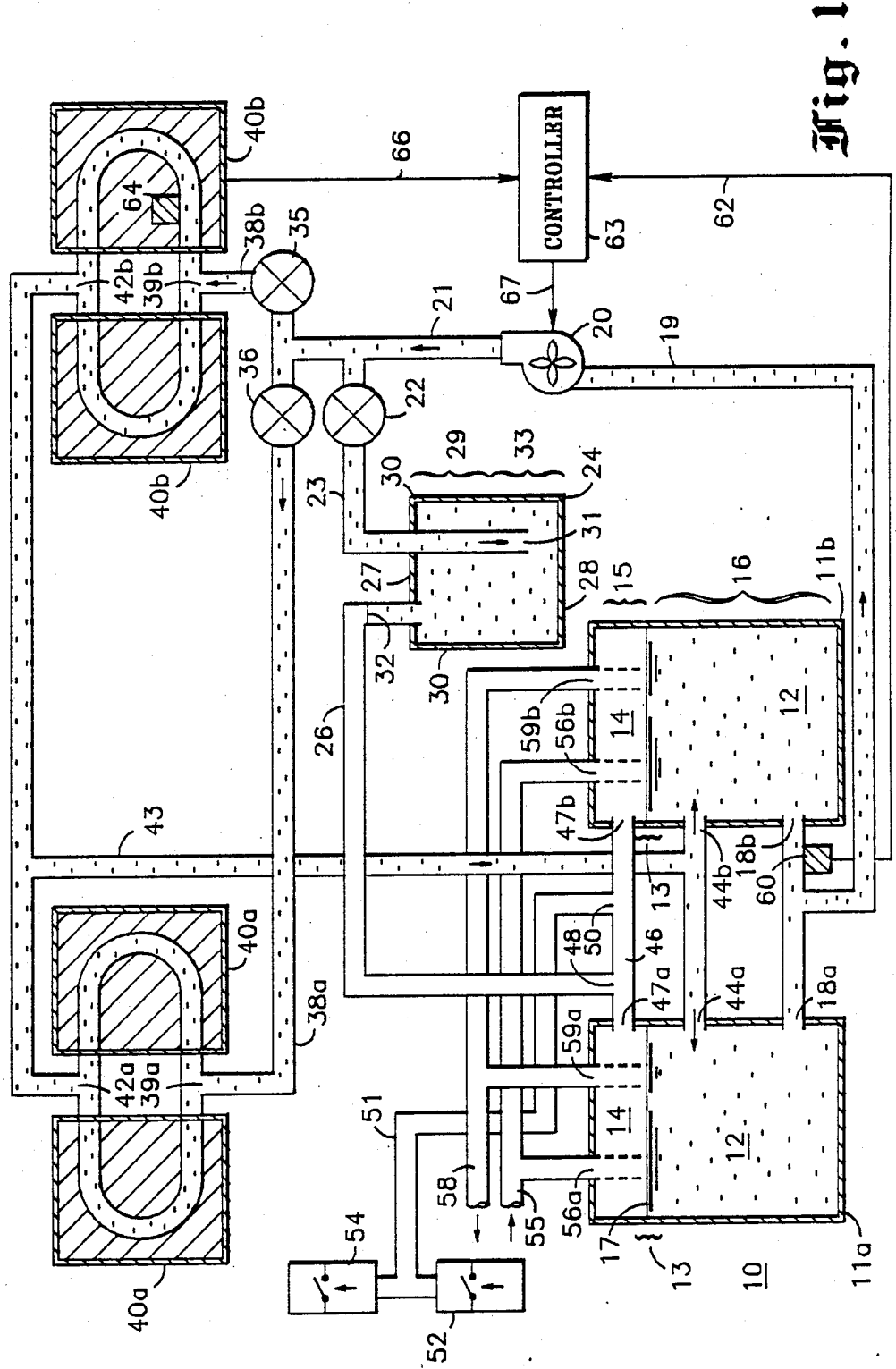
FIG. 1 shows a general diagram of a first embodiment of the present invention.

FIG. 1 shows a diagram of a solar energy system 10 which heats a domestic fluid supply (not shown), such as potable water for household use. Solar energy system 10 refrains from directly heating the domestic fluid by solar radiation. Rather, solar energy system 10 causes solar radiation to directly heat a heat transferring liquid 12, such as water. After heating liquid 12, solar energy system 10 stores liquid 12 in storage tanks 11a and 11b, collectively referred to as storage tanks 11. An inlet pipe 55 supplies the domestic fluid supply to a heat exchanger (not shown) within storage tanks 11a and 11b through couplings 56a and 56b, respectively. Heat transfers from liquid 12 to the domestic fluid within the heat exchanger inside storage tanks 11, and the heated domestic fluid exits the heat exchanger and storage tanks 11a and 11b through couplings 59a and 59b, respectively, and an outlet pipe 58.

In the preferred embodiments of the present invention storage tanks 11 resist corrosion and rust because they are constructed from a plastic material, such as polypropylene. Storage tanks 11 may be of a standard capacity (60 gallons or greater) for hot water heaters and have walls which are approximately 0.25 inches thick. This composition and configuration for storage tanks 11 permit them to withstand temperatures up to 250 degrees F. and to exhibit a life expectancy of greater than 15 years. In this embodiment the two storage tanks 11a and 11b reside at substantially the same level and connect together so that they operate similarly and in parallel with one another.

Heat transferring liquid 12 resides in a lower section 16 of each of storage tanks 11. Each of storage tanks 11 additionally contains an upper section 15 which resides above lower section 16. Upper section 15 of each of storage tanks 11 holds a gas 14, such as air. Due to buoyancy of gas 14 relatively to liquid 12, gas 14 rises when mixed with liquid 12. A surface level 17 represents a boundary within each of storage tanks 11 between liquid 12 and gas 14. The operation of solar energy system 10 causes surface level 17 to fluctuate vertically within a limited range 13. Upper section 14 describes the portion of storage tanks 11 which resides above range 13. Thus, upper section 15 holds only gas 14 regardless of the position of surface level 17. Similarly, lower section 16 describes the portion of storage tanks 11 which resides below range 13, and lower section 16 holds only liquid 12 regardless of the position of surface level 17.

Solar energy system 10 represents a closed system because it continuously reuses heat transferring liquid 12 to transfer heat to the domestic fluid supply. However, solar energy system 10 remains unpressurized so that storage tanks 11 do not experience destructive stresses.

So that storage tanks 11 remain unpressurized, a pipe, or conduit, 46 connects storage tank 11a to storage tank 11b at upper portions 15 thereof. Pipe 46 connects to a first end of a pipe 51 through a coupling 50. A second end of pipe 51 connects to a high pressure side of a lift check valve 54, and a third end of pipe 51 connects to a low pressure side of a lift check valve 52. Accordingly, gas 14 communicates with the high pressure side of lift check valve 54 and the low pressure side of lift check valve 52.

A low pressure side of lift check valve 54 and a high pressure side of lift check valve 52 open into the atmosphere. Thus, when pressure within storage tanks 11 rises, such as may occur due to expansion of heat liquid 12, excess pressure vents into the atmosphere through the operation of lift check valve 54. Conversely, when pressure within storage tanks 11 falls, such as may occur due to contraction of cooling liquid 12, air from the atmosphere enters storage tanks 11 through the operation of lift check valve 52 to raise the pressure. Thus, the operation of lift check valves 52 and 54 maintains pressure within storage tanks 11 substantially equivalent to ambient atmospheric pressure.

At couplings 18a and 18b, storage tanks 11a and 11b at the lower section 16 thereof, respectively coupled to an intake of a pump 20 through a pipe 19. An outlet of pump 20 couples to a first port of a valve 22 through a pipe 21. Valve 22 has a second port which couples to a feed 31 of a drain-back module 24 through a tube 23. A return 32 of drain-back module 24 couples to upper section 15 of storage tanks 11 through a tube 26 and a coupling 48 in pipe 46.

Pipe 21 additionally couples to first ports of valves 35 and 36. A second port of valve 36 couples to a collector feed 39a of a solar collector 40a through a pipe 38a. Likewise, a second port of valve 35 couples to a collector feed 39b of a solar collector 40b through a pipe 38b. A collector return 42a of solar collector 40a couples to a collector return 42b of solar collector 40b, coupling 44a of storage tank 11a, and coupling 44b of storage tank 11b through a pipe 43. Couplings 44 of storage tanks 11 reside above couplings 18 within lower section 16 of storage tanks 11.

A temperature sensor 60 resides near coupling 18b of storage tank 11b, and a temperature sensor 64 resides on solar collector 40b. Temperature sensors 60 and 64 electrically couple to inputs of a controller 63 through wires 62 and 66, respectively. Finally, an output of controller 63 electrically couples to pump 20 through wire 67. Temperature sensors 60 and 64 physically contact surfaces so that they measure temperatures of heat transferring liquid 12 in the lowest portion of lower section 16 of storage tank 11b and of solar collector 40b, respectively. Controller 63 controls operation of pump 20 based on a difference between the temperatures measured by sensors 60 and 64.

Pump 20 exhibits an active state in response to electrical commands from controller 36. In the active state, pump 20 forces heat transferring liquid 12 to move from storage tanks 11 toward solar collectors 40. Pump 20 additionally exhibits an inactive state in response to electrical commands from controller 63. Pump 20 does not operate when in the inactive state, hence no liquid 12 moves into solar collectors 40 when pump 20 exhibits the inactive state.

Heat transferring liquid 12 divides into two separate streams when pump 20 exhibits the active state. The first stream travels toward solar collectors 40. The second stream travels toward drain-back module 24 and exhibits a significantly lower flow rate than the first stream due to the operation of valve 22. Accordingly, both drain-back module 24 and solar collectors 40 receive liquid 12 when pump 20 exhibits the active state, but drain-back module 24 receives liquid 12 at a slower rate than solar collectors 40.

Drain-back module 24 represents a sealed container, preferably being approximately one gallon in volume, which resides above storage tanks 11. Drain-back module 24 contains an upper section 29 and a lower section 33. Upper section 29 resides above lower section 33 and contains an upper surface 27 and relatively higher sections of drain-back module walls 30. Conversely, lower section 33 contains a lower surface 28 and relatively lower sections of drain-back module walls 30.

In the embodiment of drain-back module 24 shown in FIG. 1, tube 23 passes from the exterior to the interior of drain-back module 24 at upper surface 27 within upper section 29. Tube 23 extends within the interior of drain-back module 24 from upper surface 27 to a point near lower surface 28. Drain-back feed 31 represents the end of tube 23. Tube 26 passes from the exterior to the interior of drain-back module 24 at upper surface 27, and extends within the interior of drain-back module 24 only a short distance. Additionally, tube 26 extends above drain-back module 24 before connecting to pipe 46 and storage tanks 11. Accordingly, the highest point achieved by tube 26 represents drain-back return 32.

Solar collectors 40 are positioned to receive an optimum benefit from solar radiation. Solar collectors 40 represent any of the many conventional solar collectors known to those skilled in the art and are not discussed in detail herein. However, solar collectors 40 reside above both storage tanks 11 and drain-back module 24. Additionally, solar collector 40a may reside either above or below solar collector 40b.

A difference is altitude between solar collectors 40a and 40b promotes unequal flow rates because a greater pressure is required to force heat transferring liquid 12 to circulate through the higher one of the two solar collectors 40. Accordingly, valves 35 and 36 are adjustable to maintain approximately equal flow rate of liquid 12 through solar collectors 40a and 40b. Typically, valve 35 permits a substantially unrestricted flow and valve 36 is adjusted to retard flow when solar collector 40a resides below solar collector 40b. Conversely, valve 36 permits a substantially unrestricted flow and valve 35 is adjusted to retard flow when solar collector 40b resides below solar collector 40a. Of course those skilled in the art will recognize that only one of valves 35 and 36 is necessary if attention is paid to relative vertical placement of collectors 40a and 40b.

A suitable insulation may advantageously surround each of the pipes, valves, and storage tanks described herein in a manner conventional in the art. Such insulation operates to retard undesired heat losses within solar energy system 10.

When pump 20 exhibits the inactive state, it remains inactivated until the temperature of solar collector 40b rises to the predetermined activation temperature, preferably greater than 6 degrees C., above the temperature of heat transferring liquid 12 in storage tanks 11. However, if the temperature within storage tank 11 has risen to a predetermined maximum temperature, then controller 63 may advantageously refrain from commanding pump 20 to activate, even though the activation temperature rise exists, so that energy may be conserved and pump 20 may be prevented from experiencing unnecessary wear-and-tear.

Solar collectors 40 may initially contain either gas 14 or heat transferring liquid 12 when pump 20 receives an activation command from controller 63. Typically, solar collectors 40 will contain gas 14 throughout the nightime. When solar collectors 40 contain gas 14 as pump 20 activates, liquid 12 travels from storage tanks 11, through pump 20, and valves 35, and 36, into solar collectors 40. Liquid 12 forces gas 14 back into storage tanks 11 at couplings 44 as it so travels. Gas 14 then percolates up into upper section 15 of storage tanks 11.

As heat transferring liquid 12 travels to solar collectors 40, a relatively small portion of liquid 12 additionally travels into drain-back module 24. As liquid 12 enters drain-back module 24, it forces any portion of gas 14 within drain-back module 24 out of drain-back module 24 and into upper section 15 of storage tanks 11. Drain-back module 24 continues to fill with liquid 12 so long as pump 20 remains active. Liquid 12 reaches a maximum level within drain-back module 24 when it reaches drain-back return 32. Any extra liquid 12 which enters drain-back module 24 causes an overflow in which liquid 12 returns to storage tanks 11 through tube 26 and couplings 47.

Pump 20 remains in the active state until the temperature of solar collector 40b drops below a predetermined inactivation temperature, which is preferably 3 to 6 degrees C. above the temperature of heat transferring liquid 12 in storage tanks 11. For typical operation of solar energy system 10, liquid 12, which is cooler than solar collectors 40, causes the temperature of solar collectors 40 to drop as it moves into solar collectors 40. This temperature drop causes the inactivation of pump 20, and stops the flow of liquid 12 through solar collectors 40.

When pump 20 initially inactivates, the portion of heat transferring liquid 12 residing within solar collectors 40 cannot be replaced with gas 14 because the liquid 12 in drain-back module 24 blocks passage of gas 14 to solar collectors 40. However, a siphon forms which forces liquid 12 out from drain-back module 24 in reverse direction through valve 22 and pump 20 back into storage tanks 11. Valve 22 permits liquid 12 to pass at only a low flow rate when the siphon operation occurs. Thus, a substantial, predetermined amount of time passes until a surface level of liquid 12 within drain-back module 24 reaches a drain-back feed 31.

This predetermined time delay may be manipulated to achieve a desired value by varying the relative vertical distance between drain-back feed 31 and drain-back return 32. Alternatively, valve 22 may advantageously be adjusted to affect the flow rate of heat transferring liquid 12 between drain-back module 24 and solar collectors 40.

Solar energy system 10 does not require a particular critical time delay. Rather, the predetermined time delay is sufficiently long that drain-back does not occur during the daytime on colder days, yet sufficiently short that no substantial risk of freezing or convectional circulation of liquid 12 exits. In the preferred embodiment of the present invention the siphon operation requires greater tan 3 minutes, and preferably 15 to 20 minutes, to drop the surface level of liquid 12 within drain-back module 24 from the maximum level to drain-back feed 31.

If, prior to the passage of this predetermined amount of time, the temperature of solar collector 40b increases to the activation temperature discussed above, then pump 20 again activates and moves more heat transferring liquid 12 into drain-back module 24 and solar collectors 40. The cycle of inactivating pump 20, starting a siphon in drain-back module 24, and reactivating pump 20 before the surface level of liquid 12 within drain-back module 24 reaches drain-back feed 31 repeats many times. The repetition of this cycle represents the typical operation of solar energy system 10 throughout daytime hours.

Eventually the surface level of heat transferring liquid 12 reaches drain-back feed 31 before pump 20 reactivates. This situation typically occurs near dusk when insufficient solar energy exists to heat solar collectors 40 to the activation temperature. At this point liquid 12 no longer blocks passage of gas 14 from upper section 15 of storage tanks 11, through drain-back return 32, to drain-back feed 31. Gas 14 is now free to rise to solar collectors 40, which represent the highest points in solar energy system 10. Accordingly, gas 14 enters tube 23 at drain-back feed 31, passes through valves 22, 35, and 36, and displaces liquid 12 within solar collectors 40.

In summary, solar energy system 10 permits drain-back of solar collectors 40 only after a predetermined amount of time passes following the inactivation of pump 20. This delay permits pump 29 to remain in the inactivated state a relatively large amount of time over the course of a typical day. Additionally, this predetermined time delay saves energy because pump 20 usually does not need to displace gas 14 within solar collectors 40 with heat transferring liquid 12 each time it activates.

Figure 2:
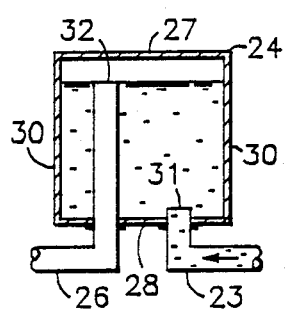
FIG. 2 shows a second embodiment of a drain-back module portion of the present invention.

Referring to FIG. 2, a second embodiment of drain-back module 24 represents a sealed container having upper surface 27 and lower surface 28 separated by walls 30. Tube 23 passes from the exterior to the interior of drain-back module 24 through lower surface 28 and extends within the interior of drain-back module 24 only a relatively short distance. Likewise, tube 26 passes between the exterior and interior of drain-back module 24 at lower surface 28. However, tube 26 extends within the interior of drain-back module 24 until a first end of tube 26 resides near upper surface 27. In this embodiment of drain-back module 24 the first end of tube 26 represents the highest point of tube 26 within solar energy system 10 (see FIG. 1). Thus, the first end of tube 26 represents drain-back return 32, and drain-back return 32 also represents the maximum level which heat transferring liquid 12 can achieve within drain-back module 24 before overflow occurs. The end of tube 23 which resides within drain-back module 24 represents drain-back feed 31.

Figure 3:
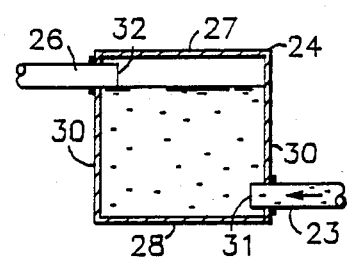
FIG. 3 shows a third embodiment of a drain back module.

Referring to FIG. 3, a third embodiment of drain-back module 24 represents a sealed container which again has upper surface 27 and lower surface 28 separated by walls 30. Tube 23 passes from the exterior to the interior of drain-back module 24 through a lower portion of walls 30 and extends horizontally a short distance within the interior of drain-back module 24. Likewise, tube 26 passes between the exterior and interior of drain-back module 24 at walls 30 and extends horizontally a short distance within the interior of drain-back module 24. However, tube 26 passes through an upper portion of walls 30. In this embodiment of drain-back module 24 the end of tube 26 which resides within drain-back module 24 represents the highest point of tube 26 within solar energy system 10 (see FIG. 1). Thus, this interior end of tube 26 represents drain-back return 32, and drain-back return 32 again represents the maximum level which heat transferring liquid 12 can achieve within drain-back module 24 before overflow occurs. The end of tube 23 which resides within drain-back module 24 represents drain-back feed 31.

Figure 4:
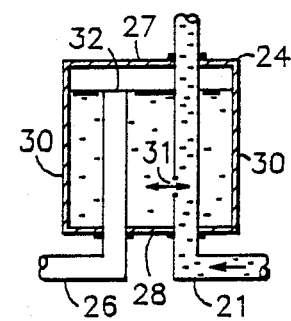
FIG. 4 shows a fourth embodiment of a drain back module.

Referring to FIG. 4, a fourth embodiment of drain-back module 24 again represents a sealed container which has upper surface 27 and lower surface 28 separated by walls 30. Tube 23 (see FIG. 1) is not utilized by the fourth embodiment of drain-back module 24. Rather, pipe 21 passes vertically from the exterior to the interior of drain-back module 24 through lower surface 28 and extends within the interior of drain-back module 24. Additionally, the fourth embodiment of drain-back module 24 omits the use of valve 22 (see FIG. 1). Instead, an opening 31 in pipe 21, which resides near lower surface 28, represents both valve 22 and drain-back feed 31. Pipe 21 extends vertically within drain-back module 24 above opening 31 and through upper surface 27.

Tube 26 passes between the exterior and interior of drain-back module 24 at lower surface 28, and extends vertically within the interior of drain-back module 24 until the first end thereof resides near upper surface 27. In this embodiment of drain-back module 24 the first end of tube 26 again represents the highest point of tube 26 within solar energy system 10 (see FIG. 1). Thus, this interior end of tube 26 again represents drain-back return 32, and drain-back return 32 additionally represents the maximum level which heat transferring liquid 12 can achieve within drain-back module 24.

Figure 5:
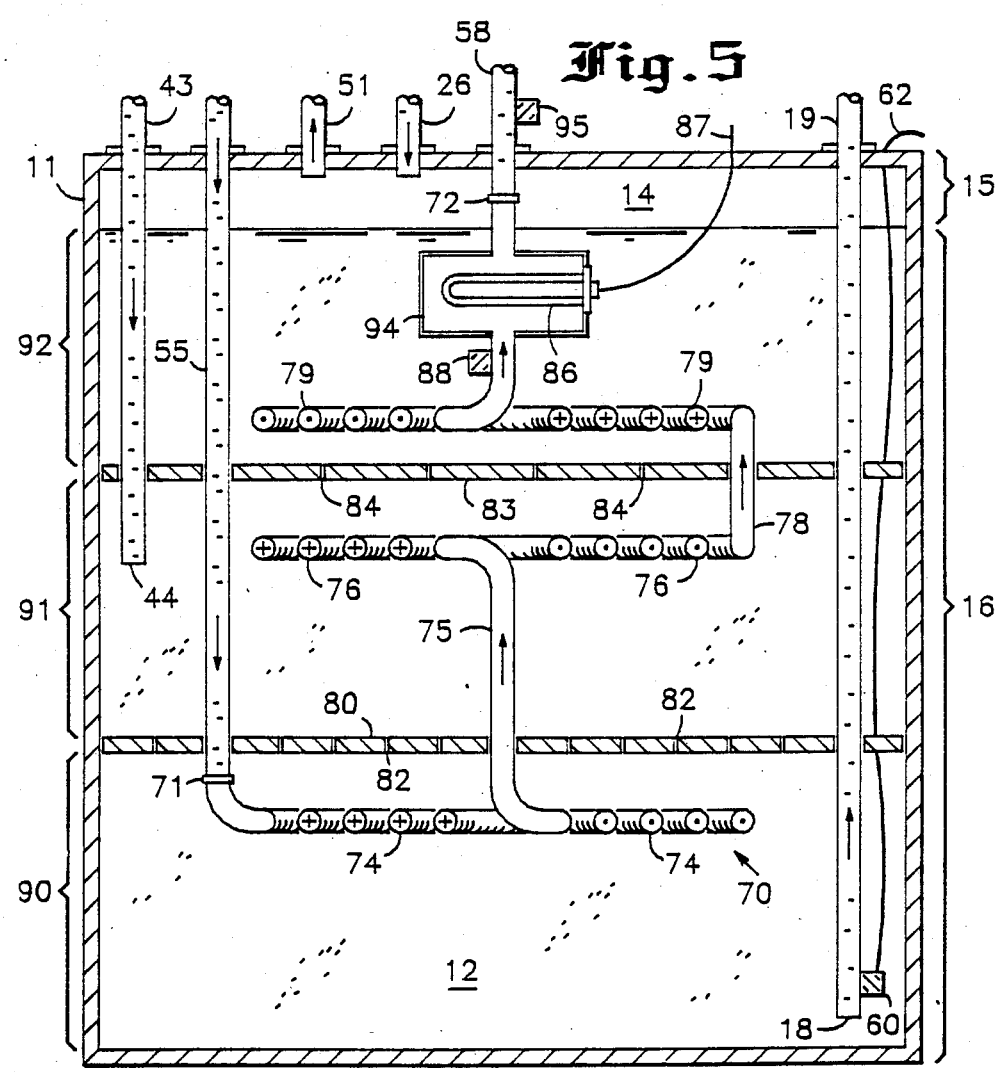
FIG. 5 shows a preferred embodiment of a storage tank portion of the present invention.

FIG. 5 shows a preferred embodiment of a storage tank 11. All pipes and wires enter storage tank 11 at upper section 15 of storage tank 11. Accordingly, pipe 43, pipe 55, pipe 51, tube 26, pipe 58, wire 62, and pipe 19 all pass from the exterior to the interior of storage tank 11 at upper section 15. Since gas 14, not heat transferring liquid 12, resides within storage tank 11 at upper section 15, no liquid 12 can leak if a seal between any pipe or wire and storage tank 11 fails.

Lower section 16 of storage tank 11 is divided into three areas. A bottom area 90 exists at the lowest portion of lower section 16. A middle area 91 exists above bottom area 90 within lower section 16 and separated from bottom area 90 by a baffle 80. Baffle 80 restricts the flow of heating transferring liquid 12 between bottom area 90 and middle area 91, but permits a small amount of liquid 12 movement between areas 90 and 91 through openings 82 within baffle 80 and a gap which exists between baffle 80 and interior walls of storage tank 11.

Top area 92 exists above middle section 91 within lower section 16 and separated from middle area 91 by a baffle 83. In a manner similar to the operation of baffle 80, baffle 83 restricts movement of heat transferring liquid 12 between middle area 91 and top area 92, but does permit a small amount of liquid 12 to move between area 91 and area 92 through openings 84 and a gap which exists between baffle 80 and interior walls of storage tank 11.

Pipe 43 passes through baffle 83, and an end thereof represents coupling 44 which couples to middle area 91 of lower section 16. Pipes 55 and 19 extend into bottom area 90 by passing through baffles 80 and 83. Pipe 19 and wire 62 extend within bottom area 90 to near a bottom surface of storage tank 11. An end of pipe 19 represents coupling 18. Additionally, temperature sensor 60 attaches to pipe 19 and resides within bottom area 90 near the bottom surface of storage tank 11.

Storage tank 11 additionally contains a heat exchanger 70. Heat exchanger 70 has a fluid inlet 71 which connects to domestic fluid inlet pipe 55 within bottom area 90, and a fluid outlet 72 which connects to domestic fluid outlet pipe 58 within top area 92. Heat exchanger 70 represents a pipe constructed of a material, such as copper, which readily conducts heat. The domestic fluid supply is routed within heat exchanger 70 from bottom area 90 upward to top area 92 as heat transfers between the domestic fluid and heat transferring liquid 12 within storage tank 11.

Additionally, heat exchanger 70 is formed into a particular shape in relation to areas 90, 91, and 92 of lower section 16. Heat exchanger 70 forms a bottom spiral 74 within bottom area 90. Spiral 74 substantially resides within a horizintal plane, and spirals from an outer convolution at heat exchanger inlet 71 to a central convolution which connects to a vertical connection section 75 of heat exchanger 70. Section 75 extends vertically upward from the central convolution of spiral 74, through baffle 80 into middle area 91, and to a central convolution of a middle spiral 76. Middle spiral 76 resides in a substantially horizontal plane and spirals from its central convolution at vertical section 75 to an outer convolution which connects to a vertical connection section 78. Section 78 extends vertically upward from the outer convolution of spiral 76, through baffle 83, into top area 92, and to an outer convolution of a top spiral 79. Top spiral 79 resides in a substantially horizontal plane and sprials from its outer convolution at vertical section 78 to a central convolution. The central convolution of top spiral 79 couples to an inlet of an in-line heating chamber 94. An outlet of in-line heating chamber 94 couples to domestic fluid supply pipe 58 at heat exchanger fluid outlet 72.

Baffles 80 and 83 along with spirals 74, 76, and 79 promote thermal stratification of heat transferring liquid 12 within storage tank 11 so that the hottest possible domestic fluid may be presented at heat exchanger fluid outlet 72. Accordingly, baffles 80 and 83 may advantageously be constructed from relatively thermally nonconductive materials. The coolest portion of liquid 12 resides within bottom area 90 because baffles 80 and 83 permit convectional movement of liquid 12. Pump 20 (see FIG. 1) moves this coolest portion of liquid 12 to collectors 40 (see FIG. 1) through pipe 19, and returns heated liquid 12 to middle area 91 through pipe 43. Since this return occurs above coupling 18 of pipe 19, thermal stratification is enhanced because convectional movement of liquid 12 tends to keep the warmer returned liquid 12 above the cooler liquid 12 within bottom area 90.

Heat exchanger 70 receives inlet fluid within bottom area 90. This inlet fluid represents the coolest portion of the domestic fluid. Due to operation of bottom spiral 74, cooler domestic fluid spends a significant amount of time in bottom area 90 before being moved to middle area 91 as it flows through heat exchanger 70. Thus, it typically absorbs some heat from bottom area 90, thereby raising its temperature, before it moves to middle area 91. Since its temperature has been raised, it has less ability to reduce the temperature of heat transferring liquid 12 within middle area 91. Accordingly, the cooler liquid 12 within bottom area 90 remains cooler because it has lost heat to the domestic supply. Additionally, the warmer liquid 12 within middle area 91 remains warmer. A similar effect results from the operation of middle spiral 76 relative to top area 92.

Storage tank 11 contains an electrical immersion heating element 86 within in-line heating chamber 94. Heating element 86 couples to a wire 87 which passes out from storage tank 11 through upper section 15. Additionally, a temperature sensor 88 which indirectly couples (not shown) to wire 87 resides in physical contact with the inlet of in-line heating chamber 94, and a temperature sensor 95 resides in contact with domestic water outlet pipe 58.

When the operation of solar energy system 10 fails to produce sufficient solar heated liquid 12 to maintain a minimum temperature within top area 92, as may occur during cold nights, solar energy system 10 directly heats the domestic water supply within in-line heating chamber 94 by electrical, rather than solar means. Temperature sensor 95 monitors the supplied domestic water temperature to control operation of heating element 86. The use of in-line heating chamber 94 permits the expenditure of smaller amouts of energy to directly heat the domestic supply than would be required to indirectly heat the domestic supply through heating a portion of heat transferring liquid 12. Additionally, heat from element 86 is absorbed by liquid 12 in top area 92 when there is no demand for the domestic supply to augment future heating of the domestic supply. The operation of baffles 80 and 83 save heating element 86 from expending energy to heat all of liquid 12 within storage tank 11. Rather, only liquid 12 within top area 92 is heated by excess heat from heating element 86.

The present invention is described above with reference to particular embodiments which facilitate teaching the invention. Those skilled in the art will recognize that many changes and modifications to the embodiments described herein also fall within the scope of the present invention. For example, only one of storage tanks 11 may be utilized by the present invention, or alternatively, more than two storage tanks 11 can be utilized by the present invention. A plurality of storage tanks may advantageously be configured to operate essentially in series rather than in parallel. The storage tanks' lower section may be divided into a different number of areas than the three areas described above. Additionally, heat transferring liquid 12 may represent substances other than water so long as desirable heat transfer characteristics are exhibited. These and other changes and modifications obvious to those skilled in the art are intended to be included within the scope of the present invention.

I claim:

1. A solar energy system comprising:
    a storage tank having upper and lower sections, said tank lower section being for holding a heat transferring liquid and said tank upper section being for holding a gas;
    a solar collector located above said storage tank and having a collector feed and a collector return wherein a first one of the collector feed and return couples to the lower section of said storage tank;
    a pump coupled to the lower section of said storage tank and to a second one of the collector feed and return, said pump exhibiting an active state in which the pump moves a portion of the liquid into said solar collector and exhibiting an inactive state; and
    means for preventing a portion of the gas from substantially replacing the liquid in said collector until a predetermined amount of time passes after said pump initially exhibits the inactive state, said preventing means being located above said storage tank and said preventing means having a drainback feed coupled to said solar collector and a drainback return coupled to the upper section of said storage tank.

2. A solar energy system as claimed in claim 1 wherein:
    a portion of the liquid moves into said preventing means when said pump exhibits the active state, and the solar energy system additionally comprises means for adjusting a first one of the drain-back feed and drain-back return of said preventing means relative to one of the collector feed and return so that the portion of the liquid moving into said preventing means is less than the portion of the liquid moving into the collector while said pump exhibits the active state.

3. A solar energy system as claimed in claim 2 additionally comprising means for adjusting said first one of said drain-back feed and drain-back return so that the maximum amount of time said preventing means delays while preventing the gas from replacing the liquid in said collector is greater than 3 minutes.

4. A solar energy system as claimed in claim 1 wherein said preventing means has an upper section and a lower section, and wherein the drain-back feed of said preventing means is located in said preventing means lower section and the drainback return of said preventing means is located in said preventing means upper section.

5. A solar energy system as claimed in claim 1 wherein:
    said preventing means comprises a container having upper and lower surfaces separated by container walls;
    the drain-back feed of said preventing means comprises a first tube having an end, said first tube passing through a first sealed opening in the container upper surface and extending within the container so that the end of said first tube resides nearer the lower surface than the upper surface; and the drain-back return of said preventing means comprises a second tube extending from above said container through a second sealed opening in the container upper surface.

6. A solar energy system as claimed in claim 1 wherein:

said preventing means comprises a container having upper and lower surfaces separated by container walls;

the drain-back feed of said preventing means comprises a first tube having an opening therein, said first tube passing through a first sealed opening in the container lower surface and extending within the container so that the opening in said first tube resides nearer the lower surface than the upper surface; and the drain-back return of said preventing means comprises a second tube having an end, said second tube passing through a second sealed opening in the container lower surface and extending within the container so that the end of said second tube resides nearer the upper surface than the lower surface.

7. A solar energy system as claimed in claim 6 wherein said first tube additionally passes through said container upper surface and couples to said solar collector.

8. A solar energy system as claimed in claim 1 wherein said storage tank is made from a plastic material to retard corrosion, and the solar energy system additionally comprises means, coupled to the upper section of said storage tank, for maintaining pressure within said storage tank substantially equivalent to ambient atmospheric pressure.

9. A solar energy system as claimed in claim 1 wherein:

said collector return couples to the lower section of said storage tank;

said pump couples to the lower section of said storage tank below a portion of the lower section where said collector return couples to the lower section of said storage tank; and said pump couples to the feed of said collector.

10. A solar energy system as claimed in claim 9 additionally comprising a heat exchanger located in the lower section of said storage tank, said heat exchanger being for routing a fluid within said storage tank so that heat transfers between the heat transferring liquid and the fluid, said heat exchanger having an fluid inlet at a bottom portion thereof and a fluid outlet at a top portion thereof.

11. A solar energy system as claimed in claim 10 wherein said heat exchanger comprises a first section of pipe forming a plurality of substantially horizontal spirals wherein each one of the plurality of spirals is coupled to and physically separated from another one of the plurality of spirals by a substantially vertical portion of said first section of pipe.

12. A solar energy system as claimed in claim 10 additionally comprising a baffle located within said storage tank, between said heat exchanger inlet and outlet, and above the coupling of said collector return to the lower section of said storage tank, said baffle being for retarding the mixing of heat transferring liquid in said storage tank between an area of said storage tank where said heat exchanger inlet resides and an area of said storage tank where said heat exchanger outlet resides.

13. A solar energy system as claimed in claim 12 additionally comprising an electrical heating element located within the lower section of said storage tank above said baffle.

14. A solar energy system as claimed in claim 13 wherein said electrical heating element resides within said heat exchanger.

15. A solar energy system as claimed in claim 10 wherein said storage tank has an exterior and an interior associated therewith, and wherein:

said collector return couples to the lower section of said storage tank through a second section of pipe which passes between the exterior and the interior of said storage tank at the upper section of said storage tank;

said pump couples to the lower section of said storage tank through a third section of pipe which passes between the exterior and the interior of said storage tank at the upper section of the storage tank;

said heat exchanger inlet couples to a fourth section of pipe which passes between the exterior and the interior of said storage tank at the upper section of the storage tank; and said heat exchanger outlet couples to a fifth section of pipe which passes between the exterior and the interior of said storage tank at the upper section of the storage tank.

16. A solar energy system as claimed in claim 1 additionally comprising a second storage tank having an upper section coupled to the upper section of said storage tank and a lower section coupled to the lower section of said storage tank.

17. A solar energy system comprising:

a storage tank having upper and lower sections, said tank lower section being for holding a heat transferring liquid and said tank upper section being for holding a gas;

a solar collector located above said storage tank and having a collector feed and a collector return, the collector return being coupled to the lower section of said storage tank;

a pump having an inlet coupled to the lower section of said storage tank and an outlet coupled to the collector feed, said pump exhibiting an active state in which the pump moves a portion of the liquid into said solar collector and said pump exhibiting an inactive state;

a drain-back module located above said storage tank and having a drain-back feed coupled to the outlet of said pump and a drain-back return coupled to the upper section of said storage tank, said drain-back module receiving a portion of the liquid when said pump exhibits the active state; and means for establishing a siphon operation of said liquid from said drain-back module to said storage tank after said pump initially exhibits the inactive state so that a portion of the gas is prevented from substantially replacing the liquid in said collector while said pump exhibits the inactive state until the siphon operation is completed.

* * * * *